US010785102B2

(12) United States Patent
Maiya Belur et al.

(10) Patent No.: US 10,785,102 B2
(45) Date of Patent: Sep. 22, 2020

(54) MODIFYING DISTRIBUTED APPLICATION BASED ON CLOUD DIAGNOSTIC DATA

(71) Applicant: VMWARE, INC., Palo Alto, CA (US)

(72) Inventors: Gurudutt Maiya Belur, San Carlos, CA (US); Ankur Soni, San Jose, CA (US); Prashant Basavaraj Gadagi, San Jose, CA (US); Jonida Cali, Menlo Park, CA (US)

(73) Assignee: VMware, Inc., Palo Alto, CA (US)

( * ) Notice: Subject to any disclaimer, the term of this patent is extended or adjusted under 35 U.S.C. 154(b) by 276 days.

(21) Appl. No.: 15/784,638

(22) Filed: Oct. 16, 2017

(65) Prior Publication Data

US 2019/0097887 A1 Mar. 28, 2019

Related U.S. Application Data

(60) Provisional application No. 62/562,446, filed on Sep. 24, 2017.

(51) Int. Cl.
G06F 15/177 (2006.01)
H04L 12/24 (2006.01)
G06F 9/50 (2006.01)
H04L 29/08 (2006.01)
H04L 12/26 (2006.01)

(52) U.S. Cl.
CPC ........ *H04L 41/0816* (2013.01); *G06F 9/5077* (2013.01); *H04L 43/04* (2013.01); *H04L 67/34* (2013.01); *H04L 41/5012* (2013.01); *H04L 41/5096* (2013.01); *H04L 43/062* (2013.01); *H04L 43/0876* (2013.01)

(58) Field of Classification Search
None
See application file for complete search history.

(56) References Cited

U.S. PATENT DOCUMENTS

| 10,009,251 | B1 * | 6/2018 | Koster | H04L 67/141 |
| 10,091,358 | B1 * | 10/2018 | Molander | H04M 3/5175 |
| 2012/0324069 | A1 | 12/2012 | Nori et al. | |
| 2013/0232498 | A1 * | 9/2013 | Mangtani | G06F 9/5072 |
| | | | | 718/104 |
| 2014/0207740 | A1 | 7/2014 | Narasayya | |

(Continued)

OTHER PUBLICATIONS

"Datadog" Wikipedia, https://en.wikipedia.org/wiki/Datadog, printed Sep. 19, 2017 pp. 1-4.

(Continued)

*Primary Examiner* — Phyllis A Book

(57) ABSTRACT

A distributed application is hosted on plural virtual machines running on a public cloud. The virtual machines are placed "permanently" in a diagnostic mode, during which diagnostic data is captured by the public cloud for each virtual machine for each capture period, e.g., each minute. Captured diagnostic data is "retired", that is, deleted, after a retirement period, e.g., 10 days. A cloud management service extracts the diagnostic data periodically from the public cloud using to an extraction period comparable to the capture period. The extracted data is aggregated across virtual machines to obtain group utilization time profiles for the distributed application. A configuration of the distributed application is then modified at least in part based on the group utilization time profiles.

6 Claims, 2 Drawing Sheets

(56) References Cited

U.S. PATENT DOCUMENTS

| | | | |
|---|---|---|---|
| 2016/0034809 A1* | 2/2016 | Trenholm | G06F 8/35 |
| | | | 706/20 |
| 2017/0006135 A1* | 1/2017 | Siebel | G06F 8/10 |
| 2017/0085447 A1* | 3/2017 | Chen | H04L 43/024 |
| 2018/0089290 A1* | 3/2018 | Haggie | G06F 16/90335 |
| 2018/0219889 A1* | 8/2018 | Oliner | G06N 3/08 |
| 2018/0262388 A1* | 9/2018 | Johnson | H04L 41/28 |
| 2018/0276043 A1* | 9/2018 | Zions | G06F 11/079 |
| 2018/0287903 A1* | 10/2018 | Joshi | H04L 43/062 |
| 2019/0036963 A1* | 1/2019 | Ahad | G06Q 10/10 |
| 2019/0163796 A1* | 5/2019 | Hodge | G06F 16/211 |

OTHER PUBLICATIONS

Sarfraz, Abbas (CLOUDMONIX), "The Ultimate List of Top Azure Monitoring Tools", http://www.cloudmonix.com/blog/the-ultimate-list-of-top-azure-monitoring-tools/, printed Sep. 19, 2017, 27 pages.

* cited by examiner

MODIFYING DISTRIBUTED APPLICATION BASED ON CLOUD DIAGNOSTIC DATA

BACKGROUND

Increasingly enterprises are moving their applications to the cloud. Managing cloud-based applications can involve determining what resources are required to run enterprise applications and how best to use the resources at hand. For example, an online retailer might what to know whether or not its current cloud resources will be able to handle increased web traffic expected due to an upcoming sales event. When enterprise applications are run on enterprise-owned and operated hardware, resource utilization data can be readily available to help answer such questions. However, when enterprises applications are run in a public cloud, the availability of such utilization depends on the cloud provider.

DETAILED DESCRIPTION

The present invention provides for leveraging cloud diagnostic data for managing and planning for a distributed application. An enterprise with a private cloud or other computer system with hardware on premises can track utilization for the hardware. For example, processor utilization, communications bandwidth, memory utilization, and storage utilization can be tracked. The resulting data can be used in many ways, for example, to aid in allocating workloads run on the hardware and for guiding decisions regarding when and how much additional hardware in the future.

When an enterprise relies on a public cloud for some or all of its computer operations, it must rely on the public-cloud provider for access to comparable utilization data. Depending on the provider, such utilization data may or may not be available to subscribers. For example, resource utilization data is not readily available to subscribers of Azure cloud services, provided by Microsoft Corporation. Thus, there can be a challenge in obtaining utilization metrics from a public cloud where the subscriber has no direct access to hardware, and the provider that has direct access to hardware does not make utilization metrics available to subscribers as a matter of course.

However, when a problem is detected in an application instance, the public cloud may activate a diagnostic mode on demand for diagnosing the host virtual machine to troubleshoot the problem. During diagnostic mode, diagnostic data, including utilization data, may be collected by the cloud provider and provided to the subscriber. Typically, the diagnostic data is collected for a single machine and for a limited (several-day) period of time. This is insufficient for many capacity planning scenarios.

The present invention provides for repurposing the cloud diagnostic data for planning modifications of a cloud-based distributed application. A group of cloud-provided virtual machines is placed in an ongoing diagnostic mode, even in the absence of any detected problem. The resulting diagnostic data is extracted periodically from the cloud to a location (which may also be in a cloud) controlled by the subscriber or a cloud-management service on behalf of the subscriber. The periodic extractions are continued for a period exceeding the cloud's retention period for the diagnostic data. For example, the cloud may retain diagnostic period for several days, while the periodic extractions may continue for a year or more so that seasonal patterns and year-to-year trends may be detected. The collected data can be aggregated to characterize an entire distributed application, a component of the distributed application, or other group of virtual machines. Future modifications of the distributed application can then be based, at least in part, on the aggregate utilization data.

Figure 1:
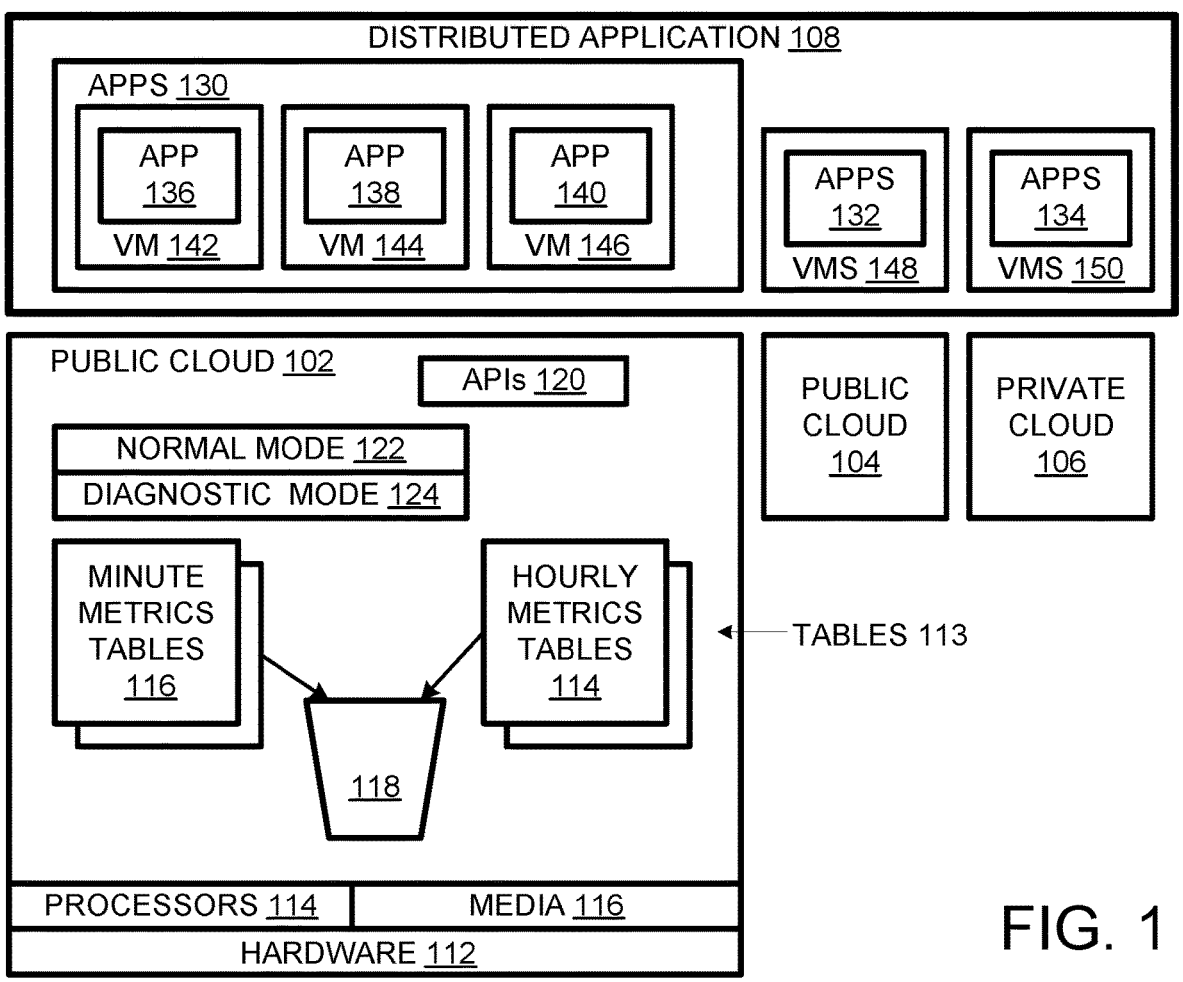
FIG. 1 is a schematic diagram of a cloud-computing system supporting a distributed application.

As shown in FIG. 1, a cloud computing system 100 includes a first public cloud 102, a second public cloud 104, and a private cloud 106. A subscriber's distributed application 108 is hosted collectively by these clouds; in other embodiments, a distributed application may be hosted by a single public cloud, plural public clouds, or any combination of public and private clouds. In addition, a cloud-based cloud management service provides a unified portal for a subscriber to manage a distributed application that is distributed across clouds.

Public cloud 102 includes hardware 112, which includes processors 114 and non-transitory media 116. Media 116 is encoded with code that, when executed by processors 114, defines the software components and functionality of public cloud 102. This software may include hypervisors that support virtual nodes such as virtual machines and process containers. In addition, the code defines the functionality of distributed application 108 running on the public cloud.

Included in the cloud software are various tables 113, including tables 114 that include diagnostic data captured on an hourly basis, and tables 116 including diagnostic data captured on a minute-by-minute basis. Each table represents one virtual machine at one point in time at one level of granularity (hour vs. minute). FIG. 1 depicts a recycle bin 118 to represent that diagnostic data "retired", that is, deleted, after 10 days or other comparable period of time.

Public cloud 102 also provides some application programming interfaces (APIs) 120 that cloud management service 110 can use to access diagnostic data. APIs 120 includes an API an API that allows a user to switch a virtual-machines mode of operation from a normal mode 122 to a diagnostic mode 124, an API that can be used to determine an internal identifier (ID) for a virtual machine, an API that, when provided with an internal ID for a virtual machine, can return the names of tables of diagnostic tables, and an API that can return contents of tables 113 in response to queries specifying table names. Collectively, these APIs provide a user access to diagnostic data captured for virtual machines in diagnostic mode.

Within a few minutes, the service can collect about 10 days of hourly and minute-by-minute utilization metrics. A complete set of utilization data for longer periods can be obtained by repeating the collection every retirement period, e.g., 10 days. However, in the illustrated embodiment, collection activity is taken for each granularity period as specified by a user. For example, the user may call for utilization data collections every minute, every 10 minutes, or every hour.

Distributed application 108 includes application instances 130 that run on public cloud 102, application instances 132 that run on public cloud 104 and application instances 134 that run on private cloud 106. In other embodiments, application instances all run on one public cloud, on plural public clouds, or some other combination of public and private clouds.

Application instances 130 include an application instance 136, an application instance 138, and an application instance 140. Application instances 136 and 138 are instances of the same application program, while application instance 140 is an instance of another application program. More generally, the application instances can be instances of any number of application programs. Application instances 136, 138, and 140 run respectively on virtual machines 142, 144, and 146 of public cloud 102. Application instances 132 run on virtual machines 148 of public cloud 104. Application instances 134 run on virtual machines 150 of private cloud 106.

Cloud management service 110 includes a metrics collector 152 that manages the extraction of diagnostic data from tables 112 of public cloud 102 and from other sources. Of course, the diagnostic data is in a "native" form determined by public cloud 102, which would typically be different than the native form of utilization data collected from public cloud 104 and private cloud 106. Accordingly, cloud-management service 110 includes a native-to-unified translator 154 to convert the data collected from diverse clouds into a unified model for purposes of comparison and aggregation. The translated data is stored in a unified metrics database 156.

An analysis engine 158 is used to generate group statistics 160 from the translated data. For example, utilization statistics, e.g., in the form of time profiles, for each tier of a multi-tier distributed application can be computed and the results stored in unified metrics database 156. Other groups can encompass an entire distributed application, and any multi-virtual-machine component of the distributed application. Analysis engine detects patterns and trends 162 in the group statistics, and uses these to generate projections and "what if" solutions 164. The generated statistics can be used for capacity planning and workload management 166. To aid in cost comparisons across clouds, analysis engine 158 can take into account pricing plans for public clouds and a cost model 168 for a private cloud (e.g. based on amortizing hardware costs).

Cloud-management service 110, may be run on various computer systems, and, may, of course, be hosted on a cloud. In any event, there will be hardware 170 including processors 172, communications devices 174, and non-transitory media encoded with code for implementing the functions described above.

Figure 2:
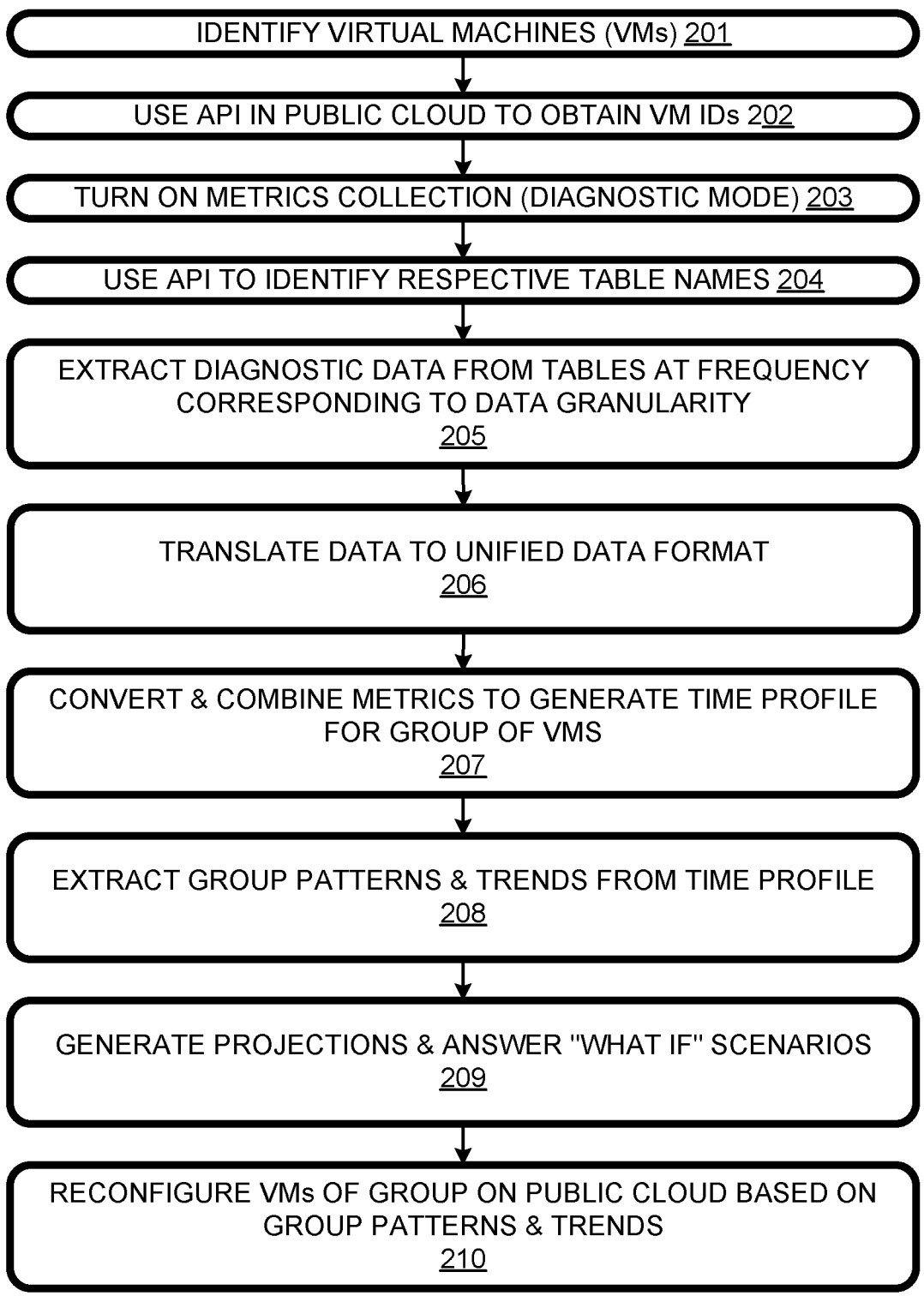
FIG. 2 is a flow chart of a process of modifying a configuration of the distributed application of FIG. 1.

A distributed application management process 200 is flow-charted in FIG. 2. At 201, the cloud-based virtual-machines hosting components of a distributed application are identified. At 202, a virtual-machine ID API is used to obtain respective identifiers for the virtual machines. At 203, a diagnostics API is used to turn on a diagnostics mode for each virtual machine that enables collection of diagnostic metrics from the respective virtual machines.

At 204, a VM ID to table names API is used to identify the names of tables containing diagnostic metric data for the virtual machines. At 205, using a database API, diagnostic data including utilization metrics is extracted from the identified tables. This extraction can be repeated at least once per recycle period (so everything is captured before it is recycled). However, to obtain near-real time performance, the data extraction can be repeated at a rate corresponding to (between half and twice) the granularity of the metrics being collected. As mentioned above, in the illustrated embodiment, utilization metrics every hour, every 10 minutes, or every minute, as specified by a user.

At 206, the collected utilization metrics are converted to a unified form so that it can be compared and aggregated with analogous data from other public and private clouds. At 207, the utilization metrics are combined/aggregated to generate utilization vs. time profiles for a group of virtual machines. The group can correspond to an entire distributed application, or to a multi-VM component of a distributed application, or to another group of virtual machines.

At 208, analysis engine extracts group utilization patterns and trends from the time profiles. At 209, projections and answers to "what if" scenarios are provided by the analysis engine. At 210, the group of virtual-machines is reconfigured based on the information generated at 209.

Generally, the term "application" can refer to: 1) a use to which something is put; or 2) a computer program designed to function as a tool to implement that use. Herein, an "application instance" is a computer program that is hosted by a single operating system instance that may be, in turn, hosted by a virtual machine, and a "distributed application" is a computer program which includes plural application instances that coordinate to fulfill a common mission. A cloud-based distributed application can be hosted exclusively on a public or private cloud, or be distributed among plural clouds.

Herein, a "cloud" is a computer system that provides virtual computer systems that can host distributed applications, components of distributed applications, and individual application instances. A cloud may be "public" or "private". A user may subscribe to a public cloud operated by a cloud provider; the cloud provider assumes responsibility for the underlying hardware and virtualization software, while the subscriber is free to focus on a distributed application and its application instances. In the case of a private cloud, the subscriber is also the provider, providing greater control over operations while still leveraging the advantages of virtualization.

The "configuration" of a distributed application encompasses the types of its apps, the number of instances of each type, and their interconnections, as well as the location (e.g., which cloud) at which each instance is hosted. Thus, a distribution application may be "reconfigured", i.e., its configuration may be physically transformed, for example, by scaling in or out an app type, updating an app, adding a new app, changing connections among apps, reallocating apps among clouds, and changing the resources allocating to an app.

"Diagnostic mode" is defined in opposition to "normal mode" or "normal production" mode". The normal mode of operation is the mode of operation for a cloud-hosting virtual machine that is designed to be used while it is performing as desired. The diagnostic mode is an alternative mode used to diagnose or trouble-shoot problems with the virtual machine. Diagnostic mode typically involves some data collection that would not occur during the normal mode of operation. Accordingly, some performance penalty may be incurred unless the provider allocates additional resources to compensate; there may be additional costs to the subscriber for operating in diagnostic mode. In the present context, the data collected during diagnostic mode includes per-virtual-machine utilization metrics.

During diagnostic mode, a public cloud can collect diagnostic data periodically to detect changes over time. For example, diagnostic data collections can be performed once per minute "collection period" during diagnostic mode. Alternatively, or in addition, the diagnostic data can be collected using an hourly collection period. Each diagnostic data collection can be stored for a "storage duration", e.g., 10 days.

The illustrated cloud management service calls for putting all virtual machines hosting the distributed application on the public cloud to be in diagnostic mode whether or not any problems have been detected. One immediate advantage of this is that, when a problem is detected, the previous 10 days of diagnostic data is likely to include some useful baseline data from before the problem occurred. Such baseline data would not automatically be collected if the collections can only start after the problem is detected.

In the illustrated embodiment, the diagnostic data is extracted periodically over an extraction duration longer than the storage duration for the diagnostic data. For example, the extraction duration can be a year or more so that seasonal patterns and yearly trends can be detected.

Generally, it is contemplated that the vendor for the cloud service to be set in diagnostic mode is diverse (i.e., separate and distinct from) the vendor that provides the cloud-management service.

Extracting using an extraction period equal to the storage period would allow all diagnostic data to be extracted. However, collecting using an extraction period equal to the collection period makes the information contained therein available to the subscriber in near real time. Any decisions based on the collected data would be based on the most recent information available.

Herein, all art labeled "prior art", if any, is admitted prior art; art not labelled "prior art", is not admitted prior art. The illustrated embodiments, variations thereupon, and modification thereto are provided for by the present invention, the scope of which is defined by the following claims.

What is claimed is:

1. A process for reconfiguring a cloud-based distributed application, the process comprising:
    identifying plural public-cloud virtual machines of a public cloud that are hosting application instances of a distributed application;
    setting each of the virtual machines of a public cloud to a diagnostic mode of operation in which per-virtual-machine diagnostic metrics for that virtual machine are collected periodically using a first average collection period;
    wherein the per-virtual-machine diagnostic metrics collected during each collection period are stored by the public cloud temporarily for a storage duration;
    wherein each of the virtual machines having an alternative normal mode of operation in which such per-virtual-machine diagnostic metrics are not collected periodically and are not stored temporarily for the storage duration;
    wherein each of the virtual machines of said public cloud are set to said diagnostic mode without first requiring any detected problem;
    extracting the per-virtual-machine diagnostic metrics from the public cloud periodically over an extraction duration longer than the storage duration, and wherein said per-virtual-machine diagnostic metrics are stored for said storage duration, said storage duration exceeding a conventional storage duration of conventional diagnostic data;
    aggregating the extracted per-virtual-machine diagnostic metrics to generate distributed-application utilization metrics for the distributed application or for a multi-virtual-machine component of the distributed application; and
    reconfiguring the distributed application based at least in part on the distributed-application utilization metrics.

2. The process of claim 1 wherein the extractions are obtained from mutually-exclusive sets of tables, a first containing per-hour utilization data and a second containing per minute utilization data.

3. The process of claim 1 wherein the extracting and aggregating are performed by cloud-management service provided by a cloud-management vendor that is diverse from a cloud vendor that provides the public cloud that is set in diagnostic mode.

4. A system comprising non-transitory media encoded with code that, when executed by a processor, implements a process including:
    identifying plural public-cloud virtual machines of a public cloud that are hosting application instances of a distributed application;
    setting each of the virtual machines of a public cloud to a diagnostic mode of operation in which per-virtual-machine diagnostic metrics for that virtual machine are collected periodically using a first average collection period;
    wherein the per-virtual-machine diagnostic metrics collected during each collection period are stored by the public cloud temporarily for a storage duration;
    wherein each of the virtual machines having an alternative normal mode of operation in which such per-virtual-machine diagnostic metrics are not collected periodically and are not stored temporarily for the storage duration;
    wherein each of the virtual machines of said public cloud are set to said diagnostic mode without first requiring any detected problem;
    extracting the per-virtual-machine diagnostic metrics from the public cloud periodically over an extraction duration longer than the storage duration, and wherein said per-virtual-machine diagnostic metrics are stored for said storage duration, said storage duration exceeding a conventional storage duration of conventional diagnostic data;
    aggregating the extracted per-virtual-machine diagnostic metrics to generate distributed-application utilization metrics for the distributed application or for a multi-virtual-machine component of the distributed application; and
    reconfiguring the distributed application based at least in part on the distributed-application utilization metrics.

5. The system of claim 4 wherein the extractions are obtained from mutually-exclusive sets of tables, a first containing per-hour utilization data and a second containing per minute utilization data.

6. The system of claim 4 wherein the extracting and aggregating are performed by cloud-management service provided by a cloud-management vendor that is diverse from a cloud vendor that provides the public cloud that is set in diagnostic mode.

* * * * *